(No Model.) 2 Sheets—Sheet 1.

S. H. HOLLEY.
STONE CHANNELING MACHINE.

No. 508,016. Patented Nov. 7, 1893.

Witnesses:
N. G. D. Haas
S. V. Rawlings

Inventor:
Seymour H. Holley
By Peirce & Fisher
Attorneys

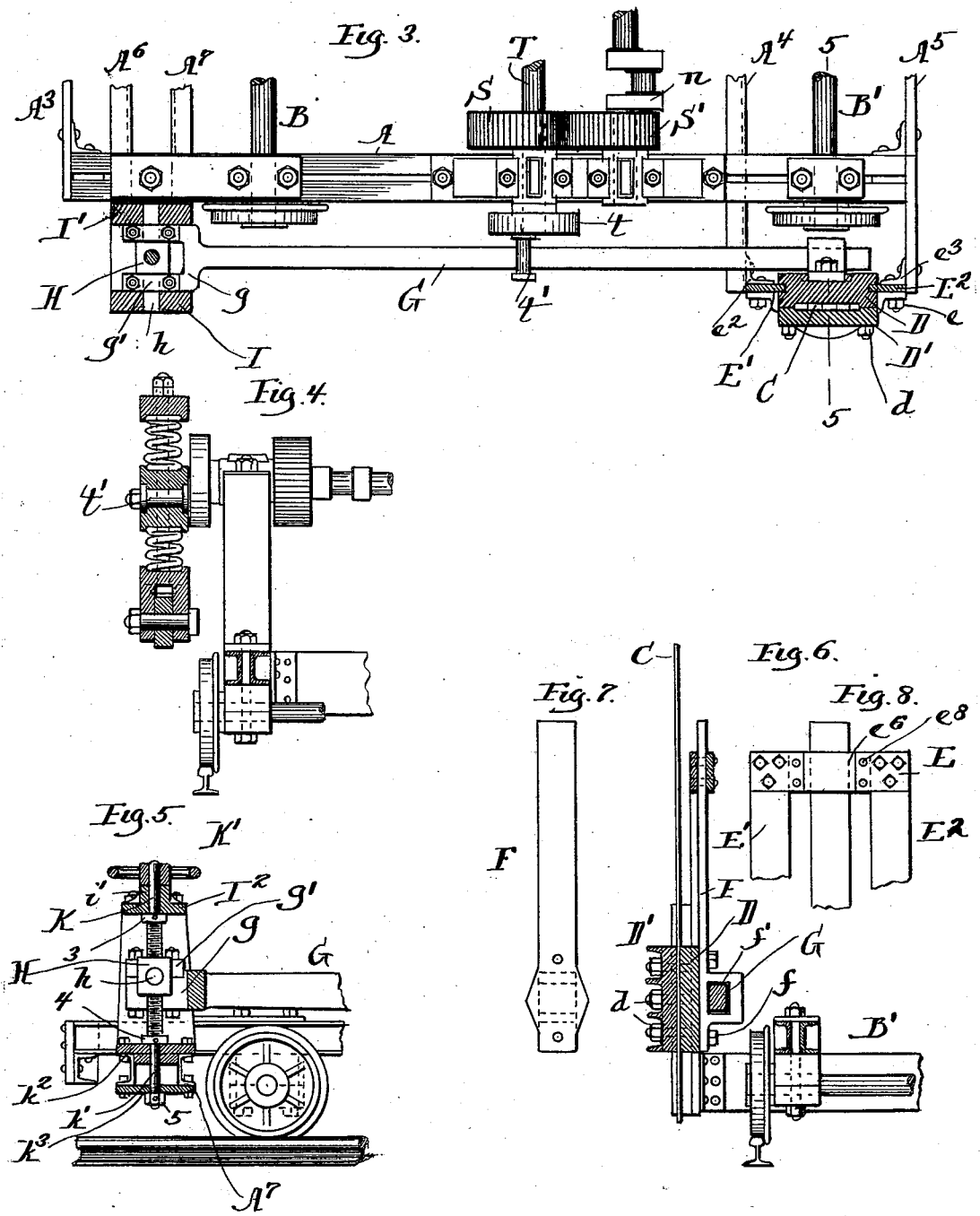

# UNITED STATES PATENT OFFICE.

SEYMOUR H. HOLLEY, OF MARQUETTE, MICHIGAN.

STONE-CHANNELING MACHINE.

SPECIFICATION forming part of Letters Patent No. 508,016, dated November 7, 1893.

Application filed March 6, 1893. Serial No. 464,714. (No model.)

*To all whom it may concern:*

Be it known that I, SEYMOUR H. HOLLEY, a citizen of the United States, residing at Marquette, in the State of Michigan, have invented certain new and useful Improvements in Stone-Channeling Machines, of which I do declare the following to be a full and exact description, reference being had to the accompanying drawings, forming a part of this specification.

Figure 1:
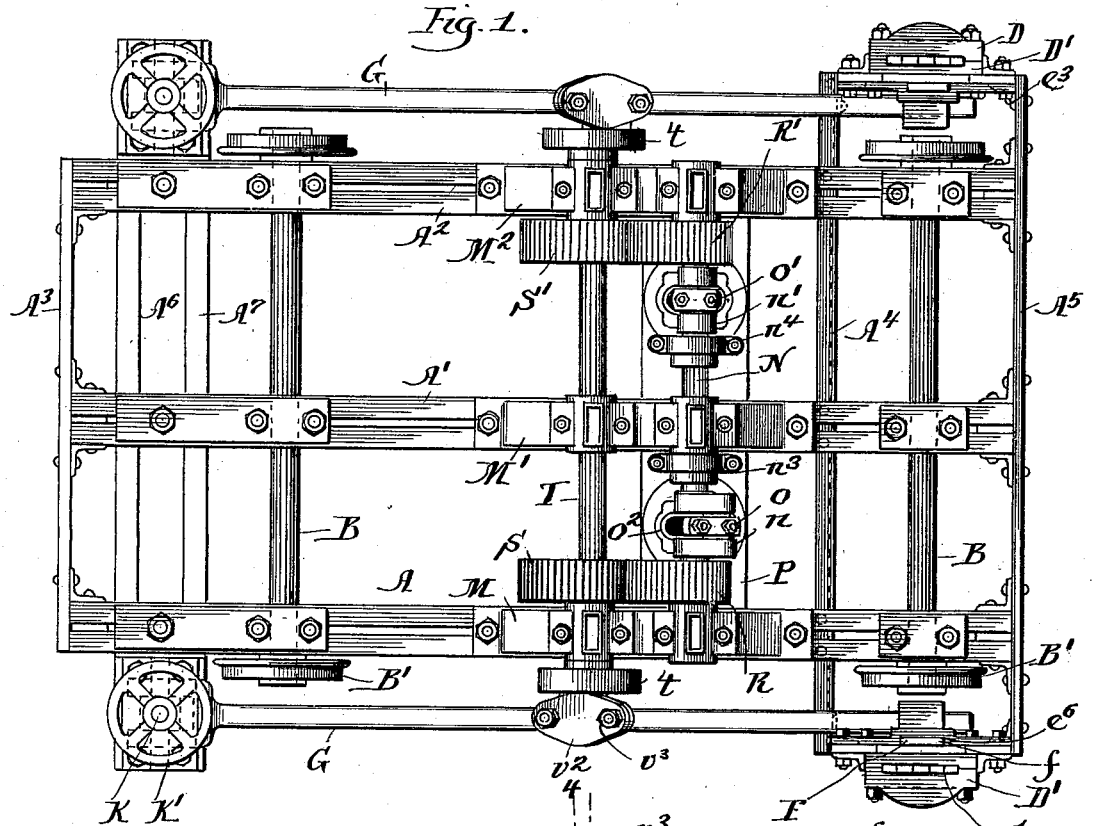
Figure 2:
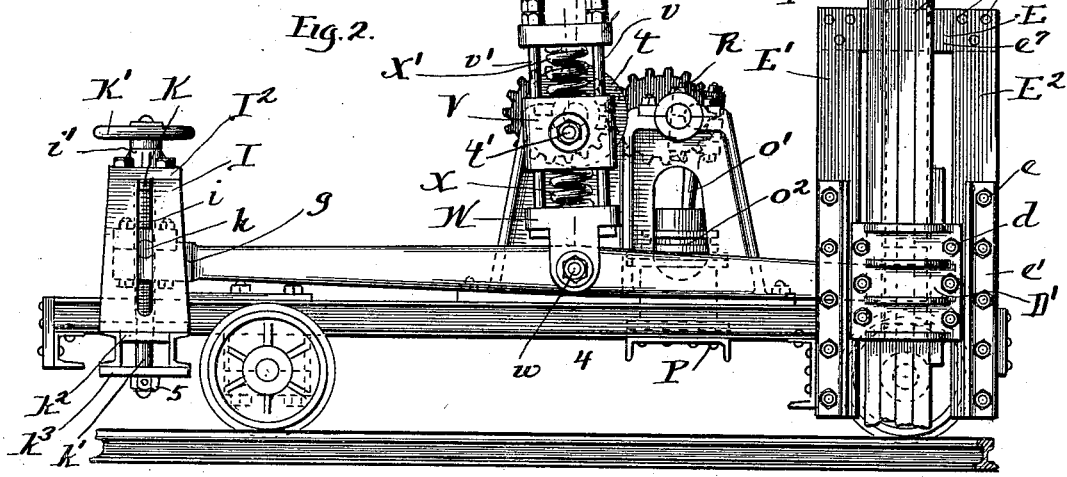

Figure 1 is a plan view of a machine embodying my improvements. Fig. 2 is a view in side elevation. Fig. 3 is a view showing partly in plan and partly in horizontal section the mechanism at one side of the machine, certain of the parts being removed. Fig. 4 is a fractional view in vertical section on line 4—4 of Fig. 2, parts being shown in elevation. Fig. 5 is a fractional view partly in side elevation and partly in vertical longitudinal section through the adjusting mechanism of one of the operating levers. Fig. 6 is a fractional view partly in side elevation and partly in vertical section on line 5—5 of Fig. 3. Fig. 7 is a detail front view of one of the slide bars at the end of the operating lever. Fig. 8 is a detail fractional view showing the upper portion of one of the slide bars for the operating levers, and the guide frame therefor.

My present invention has relation more particularly to that class of stone channeling machines wherein the cutting tools are raised and lowered by suitably driven operating levers.

My invention has for its object, first, to provide improved gearing whereby motion is imparted to the operating lever or levers so that a quick downward motion and a slow upward motion will be imparted to the cutting tools, thereby securing not only a more effective action of the tools, but insuring also a material economy in steam or other power whereby the tools are operated; secondly, my invention has for its object to provide improved spring mechanism for cushioning the operating levers whereby all jar shall be removed from the tools, and any excess in the length of their stroke will be compensated for; thirdly, my invention has for its object to provide improved means for adjusting the pivot points of the levers in order to properly position the parts to meet the different requirements of the work; and finally, my invention has for its object to improve in various details the construction of the apparatus. These several objects of invention I have accomplished by the novel features of construction hereinafter described, illustrated in the accompanying drawings and particularly pointed out in the claims at the end of this specification.

The main frame of the machine, which will preferably consist of the longitudinal bars A, A', and A², and cross bars A³, A⁴, A⁵, A⁶ and A⁷, will be supported upon suitable truck axles and wheels B, B'. The transverse bars A⁴ and A⁵ are extended beyond the sides of the machine and at the opposite ends of these bars are sustained the cutting tools C in suitable number and of appropriate construction. Each set of tools C is held within a tool stock or carrier consisting of the sections D and D', these sections being connected together by the bolts $d$ which serve to firmly clamp the tools C between the sections and upon the opposite ends of the transverse bars A⁴ and A⁵ are mounted the guide frames for the tool stocks, these guide frames being preferably formed of the cross bars E and the vertical bars E' and E² that are bolted as at $e$, to the plates $e'$ and to the angle bars $e^2$ that are attached as at $e^3$ to the ends of the transverse bars A⁴ and A⁵. The inner section D of each of the tool stocks or carriers has attached to its back, by suitable screws $f$ a vertical slide bar F, the upper part of this slide bar extending through a guide way $e^6$ formed by bending the cross bar E, the front of this guide way being closed by a plate $e^7$ suitably bolted as at $e^8$ to the cross bar E; and the lower part of each of the slide bars F is formed with a socket $f'$ to receive the free end of one of the operating levers G. As each of the operating levers G, and the mechanism whereby it is sustained and driven are the same for each side of the machine, a description of one of these levers and the means whereby it is operated will answer for both. Each of the levers G has a bifurcated end $g$ the arms of which are attached by cap plates $g'$ to the trunnion pins $h$ of the shifting block H, that sets between the arms of the lever, the trunnion pins $h$ extending through the slots $i$ that are formed in the standards I and I' that rise from the extended ends of the cross bars $A^6$ and $A^7$ of the main frame, these standards I and I' being united by the top plate $I^2$. Each of the top plates $I^2$ is formed with a hub $i'$ through which passes the plain end of the adjusting screw K, the upper end of this screw being furnished with a hand wheel K' whereby it may be operated. The screw K extends through a correspondingly threaded perforation formed in the shifting block H, and the lower end of the screw K is formed with a plain portion $k'$ passing through the cross plates $k^2$ and $k^3$ that are bolted to the ends of the cross bars $A^7$ and $A^6$. (See Fig. 5.) Suitable collars 3 and 4, and a nut 5 will serve to hold the adjusting screw K against displacement.

From the foregoing description it will be seen that when it is desired to shift the fulcrum of either of the levers G, to meet the requirements of the work, as for example, in beginning new work, this can be readily done by turning the adjusting screw K by means of the hand wheel K'.

The mechanism whereby the operating levers G are driven will next be described.

Upon the beams A, A' and $A^2$ are mounted the standards M, M' and $M^2$, that serve to sustain the crank shaft N, the cranks $n$, $n'$ of which are connected to suitable pitman rods O and O' that are operated by the piston within the cylinders $O^2$ of a vertical engine that is sustained by the transverse base plate P carried by the main frame. Upon the crank shaft N are also mounted the usual eccentrics $n^3$ and $n^4$ that serve to operate the engine valve in manner well understood in the art, but as these constitute no part of my invention, I have not deemed it necessary to illustrate or describe the engine or its connections with greater particularity.

While I have shown a vertical engine, it is manifest that my invention is not restricted thereto, as the driving of the crank shaft may be effected in any suitable manner.

Upon the crank shaft N are keyed the elliptical gear wheels R and R' that engage with corresponding gear wheels S and S' upon the shaft T, that is journaled within suitable boxes on the tops of the standards M, M' and $M^2$ that rise from the main frame. The ends of the shaft T are extended beyond their bearings and upon each end is fixed a disk $t$ carrying the crank pin $t'$ whereon is held a block V that is mounted in manner free to slide upon the vertical rods $v$, $v'$. The rods $v$, $v'$ have their lower headed ends extending through the bifurcated block W that straddles the operating lever G and is pivotally connected thereto by the through bolt $w$. The upper ends of the rods $v$, $v'$ extend through the cross head $v^2$ which is held in place on the rods by the nuts $v^3$, and between the cross head $v^2$ and the block V, and as well also between the block $v$ and the pivot head W are the springs X and X' which serve to cushion the stroke of the operating lever so as to avoid all jar and as well also compensate for any inequalities in the length of stroke of the tools.

From the foregoing description it will be seen that when revolution is imparted to the crank shaft N it will be transmitted from said shaft through the elliptical gears R, R' and S, S', to shaft T and crank pins $t$, and to the operating levers G through the medium of connections between said levers and the crank pins. It will also be seen that the elliptical gears serve to give an alternate quick and slow motion to the operating levers G, these gears being so set that the quick motion shall be given to the operating levers upon their down-stroke and the slow motion shall be given to these levers upon their up-stroke. This use of elliptical gears for imparting movement to the operating levers is highly advantageous, not only for the reason that an increased force of blow is thereby given to the tools, but also, since the slow movement is imparted to the operating levers upon their up-stroke, a much more effective application of the power is had for raising the heavy tool stocks and tools, and as well also the levers, and this is particularly important when the apparatus is used in making very deep cuts.

While I have described what I regard as the best embodiment of my invention, it is manifest that the precise details of construction above set out may be varied by the skilled mechanic without departing from the spirit of my invention.

In lieu of double engines $O^2$ a single one may be used, the crank-shaft N being then located beneath the eccentric shaft T, and driven by bevel-gear from the engine. The elliptic gear between said shaft N T would however be retained. Since the mode of applying the engine power forms no part of the improvement and in the change proposed concerns merely a greater compactness in width of the machine it is unnecessary to exhibit. So too, the fulcrum and point of applied power for the operating levers G can be reversed, i. e. the shafts N T and adjuncts be set at the end of the machine and the standards I I' with fulcrum blocks H be set in their place at the center thereby simply changing the order or character of lever G. The reaction springs X X' can be elliptic in form or be blocks of rubber if desired. These and other like modifications in detail which the skill of the mechanic will suggest are equally within the essential scope of the improvements set forth.

Having thus described my invention, what I claim as new, and desire to secure by Letters Patent, is—

1. In a stone channeling machine the combination with the main frame, of suitable standards rising from said frame, a crank shaft and a driving shaft journaled in said standards, the ends of said driving shaft extending beyond said standards, tool-carrying operating levers arranged at the sides of the main frame and connecting with the driving shaft, and elliptic gears connecting the crank shaft and the driving shaft, and so arranged that the quick downward motion and a slow upward motion will be imparted to the operating levers, substantially as described.

2. In a stone channeling machine, the combination with the operating lever and suitable means for imparting movement thereto of a vertically movable fulcrum block to which said lever is connected, a screw for adjusting said fulcrum block securely journaled at both ends and extending through said block, and standards having slots to receive the trunnions of said fulcrum block, substantially as described.

SEYMOUR H. HOLLEY.

Witnesses:
SAMUEL V. RAWLINGS,
N. G. DeHAAS.